United States Patent

Oversberg

[11] Patent Number: 6,007,765
[45] Date of Patent: Dec. 28, 1999

[54] METHOD OF PRODUCING MOLDED ARTICLES

[75] Inventor: Hans-Hermann Oversberg, Mönchengladbach, Germany

[73] Assignee: Exori-Import-Export GmbH & Co. KG, Germany

[21] Appl. No.: 08/930,130

[22] PCT Filed: Apr. 20, 1996

[86] PCT No.: PCT/EP96/01664

§ 371 Date: Dec. 19, 1997

§ 102(e) Date: Dec. 19, 1997

[87] PCT Pub. No.: WO96/33057

PCT Pub. Date: Oct. 24, 1996

[30] Foreign Application Priority Data

Apr. 21, 1995 [DE] Germany .................. 195 14 789

[51] Int. Cl.⁶ .................................................. B22F 8/00
[52] U.S. Cl. .................... 419/10; 419/65; 419/66
[58] Field of Search ................... 419/10, 65, 66; 588/6–8, 11, 256

[56] References Cited

U.S. PATENT DOCUMENTS

| | | | |
|---|---|---|---|
| 3,567,811 | 3/1971 | Humphrey | 94/13 |
| 3,802,902 | 4/1974 | Turner, Jr. et al. | 106/38.3 |
| 3,973,922 | 8/1976 | Williams | 94/13 |
| 4,163,000 | 7/1979 | Kashima et al. | 260/29.6 |
| 4,266,921 | 5/1981 | Murray | 425/158 |
| 4,341,559 | 7/1982 | Friedemann et al. | 106/38.35 |
| 4,399,858 | 8/1983 | Kurabe et al. | 164/16 |
| 4,505,750 | 3/1985 | Cowan | 106/38.35 |
| 4,541,869 | 9/1985 | Maak et al. | 106/38.35 |
| 4,763,720 | 8/1988 | Sakamoto et al. | 164/525 |
| 4,830,611 | 5/1989 | Guntermann et al. | 432/225 |
| 5,162,393 | 11/1992 | Griffin et al. | 523/145 |

FOREIGN PATENT DOCUMENTS

| | | |
|---|---|---|
| 180648 | 1/1907 | Germany . |
| 736323 | 6/1943 | Germany . |
| 4100540 | 7/1992 | Germany . |
| 4221070 | 12/1993 | Germany . |
| 4316901 | 12/1993 | Germany . |
| 4329255 | 9/1994 | Germany . |
| 4342678 | 6/1995 | Germany . |
| 57-062837 | 4/1982 | Japan . |
| 9204169 | 3/1992 | WIPO . |

*Primary Examiner*—Ngoclan Mai
*Attorney, Agent, or Firm*—Robert W. Becker & Associates

[57] ABSTRACT

A method of producing molded articles is provided. Raw materials that have been reduced in size are mixed together, are prepared with at least one binder, are pressed into molds, and are hardened.

15 Claims, 1 Drawing Sheet

METHOD OF PRODUCING MOLDED ARTICLES

BACKGROUND OF THE INVENTION

The present invention relates to a method of producing molded articles or moldings.

A number of methods are known for producing molded articles and finished parts. One possibility for classifying these methods is by the raw material that is used as well as the structure and properties thereof. In the context of the present invention, raw material means a material from which very different molded articles can be produced. Depending upon the respective method and method steps and the raw materials utilized, the molded articles that are produced have different characteristics.

The known methods for producing molded articles are extremely energy and cost intensive, not only with regard to the procedural techniques that are used but also with regard to the raw materials that are utilized. As a consequence of the extremely difficult handling of the methods and of the raw materials utilized, a directed influencing of the technological characteristics of the manufactured molded article is possible only to a limited extent.

It is therefore an object of the present invention to provide a method of producing molded articles with which, by selection of the raw materials or raw material compositions that are utilized, as well as by method steps that are adapted to one another and are also coordinated to the appropriate raw materials, a directed influence can be undertaken upon the technological characteristics of the molded article, so that the molded articles can be produced with the desired technological characteristics at low energy consumption and low cost.

SUMMARY OF THE INVENTION

To realize the objective of the present invention, a method is proposed whereby raw materials that have been ground or reduced in size are mixed together, are prepared with or have incorporated therein at least one binding agent or binder, are pressed into molds, and are hardened.

The method of the present invention utilizes raw materials that have been reduced in size, for example being in the form of granulates, powders, chips, shavings or dust. These can have various grain sizes and can be not only granular but also fibrous. The grain sizes should be in a range of from 0.3 mm to a maximum of 3.0 mm, whereby granulates and spherical shapes will be smaller than particles having indefinite edges. Leftover or recycled material can advantageously be used as the raw materials. Furthermore, it is particularly advantageous for the raw materials to be metals, especially scrap metal, any plastic, construction materials, for example mortar, plaster or cement, as well as organic materials, for example wood chips and paper fluff. Since the reduction in size of all types of material is part of the energy intensive procedural techniques and processes, the raw materials that are to be used should advantageously already be reduced in size. For this purpose, examples of suitable material are metal powder resulting from a dust collection or separation process, or for example grinding and drilling residue that is produced in the automobile industry, as well as similar residue having another origin, for example wood chips and paper fluff. In this way, on the one hand the energy required during the manufacture of molded articles is reduced, and on the other hand there is effected a practical reutilization or recycling of raw materials. If necessary, the raw materials that have been reduced in size can advantageously have different grain sizes and/or can comprise different types of raw materials. In this way, by means of a directed raw material composition, various characteristics of the molded articles that are to be produced can first of all be influenced, for example the density.

The raw materials that have been reduced in size are mixed together. In so doing, the materials are combined in such a way that they are substantially homogeneous, so that when any partial volume of the raw materials is extracted, it has an as uniform as possible composition of the individual raw material components. The size-reduced raw materials are advantageously mixed in a vessel in a dry state. The dry mixing of the size-reduced raw materials has the advantage that to begin with no unintended reactions, for example between the various size-reduced raw materials or further mixture products, for example largely liquid products, occur.

Subsequently, at least one binder is utilized to prepare the mixture of size-reduced raw materials. In this connection, pursuant to a further proposal of the present invention, water glass (sodium silicate), paraffin, and various thermoplastics are particularly suitable as binders. As a result of these binders, in the further method steps a binder, in other words a stiffening or solidification accelerator, is made available. The preparation of the mixed, size-reduced raw materials with the binder is effected in a further mixing process, for example with a conventional sand mixer. If water glass is to be used, then pursuant to a further proposal of the present invention a proportion of up to 20% water glass is utilized.

One particular aspect of the present invention is comprised in the preparation of the mixed raw materials with at least one binder. Depending upon the raw materials that are used, and the appropriate binder, the preparation can result in an exothermic reaction, which simultaneously results in a drying effect. In this connection, the raw material is heated, for example, in such a way that liquid constituents, for example water, can diffuse out, whereby the raw material is dried. Similarly, a bonding is produced between the raw materials, especially for polymeric materials and thermoplastics.

Pursuant to a further step of the inventive method, the mixed, size-reduced raw materials that are prepared with at least one binder are pressed into molds. For this purpose, permanent molds are advantageously used, so that a greater number of the same molded articles can be produced with one and the same mold. As a consequence of the pressing, a cohesion of the mixed materials is produced. Pursuant to another proposal of the present invention, compressed air is utilized for the pressing. Similar to the situation encountered in the powder metallurgy arena, for this purpose compression or press molds are advantageously utilized. Pursuant to a further proposal of the present invention, inserts are used in the permanent molds. This increases in a directed manner the stability of the molded articles that are to be produced. To press the mixed, size-reduced raw materials that are prepared with at least one binder into the appropriate molds, conventional core shooters or core-molding machines can be advantageously utilized.

In a further step of the inventive method, the mixture, which comprises mixed, size-reduced raw materials that have been prepared with at least one binder, for example water glass, and that has been pressed into molds, is hardened. Pursuant to another proposal of the present invention, the hardening is effected by the introduction of gas. In so doing, the mixed, raw materials that have been prepared, for example with water glass and have been pressed into molds, are brought into contact with a gas. In so doing, the mixture stiffens and hardens. In particular $CO_2$ gas is advantageously utilized for the gasification step. By means of the $CO_2$ gas, the binder, such as water glass, that is present in the mixture is, for example, dissociated. This dissociated binder bonds with the mixed, size-reduced raw materials and is subsequently again consolidated.

Pursuant to a further step of the inventive method, the solid molded article can be subjected to a thermal treatment and thus be subjected to a second cure. As a consequence of the thermal treatment, with a given composition the structure and hence the desired properties of the solid body, i.e., the materials thereof, can be set, for example the hardness or the strength. The second cure of the molded articles is advantageously effected by means of an annealing operation. In so doing, the molded article is heated to specific temperatures until a uniform temperature and, if desired, a homogeneous mixture are achieved. Subsequently, the molded article is cooled off and thus subjected to further hardening. These processes permit the directed setting of structures and hence also a directed influence upon the technological characteristics of the molded article. For example surface character, hardness or durability. The annealing is advantageously effected at about 200° C. As a consequence, the various size-reduced raw materials, especially when dealing with metals, do not melt.

In a final step, the molded article is covered with polymeric material. This ensures that harmful materials that might be contained in the mixed, size-reduced raw materials cannot escape the molded article, in other words, cannot pollute the environment by contact therewith or by chemical reactions. Furthermore, the covering of the molded articles with polymeric material represents a further surface treatment or finishing.

The present invention provides a method that makes it possible to produce molded articles with technological properties that can be set over wide ranges by a directed selection and determination of raw materials and appropriate method steps. For example, molded articles can be produced that, for example by the directed setting of the specific weight, are suitable for replacing all appropriate molded articles that have been used to date. The molded articles produced pursuant to the inventive method advantageously have a density of 5 g/cm$^3$ to 6 g/cm$^3$. For example, molded articles can be produced for fishing purposes, with such molded articles having a specific weight that nearly corresponds to that of lead (thus being a substitute material for lead). Similarly, floats or wobblers can be produced, for example if sawdust and water glass are used. Furthermore, metallic molded articles can be produced that have plastic properties, for example by the selection of raw materials and as a consequence of the fact that pursuant to the inventive method such materials do not melt. With relatively simple means, it is advantageously possible to produce molded articles that can be used, for example, in the construction industry, for example in the form of insulating panels.

Of particular advantage is the fact that the method of the present invention enables the use of recycled or leftover materials, especially recycled metallic materials, and that conventional production machines can be utilized, for example conventional sand mixers or core-molding machines. Furthermore, by means of a directed selection of raw materials and method steps that are coordinated with one another, the inventive method provides a reduced energy and cost production of very different types of molded articles having technological properties that can be set in a directed manner.

DESCRIPTION OF PREFERRED EMBODIMENTS AND BEST MODE FOR CARRYING OUT THE INVENTION

Figure 1:
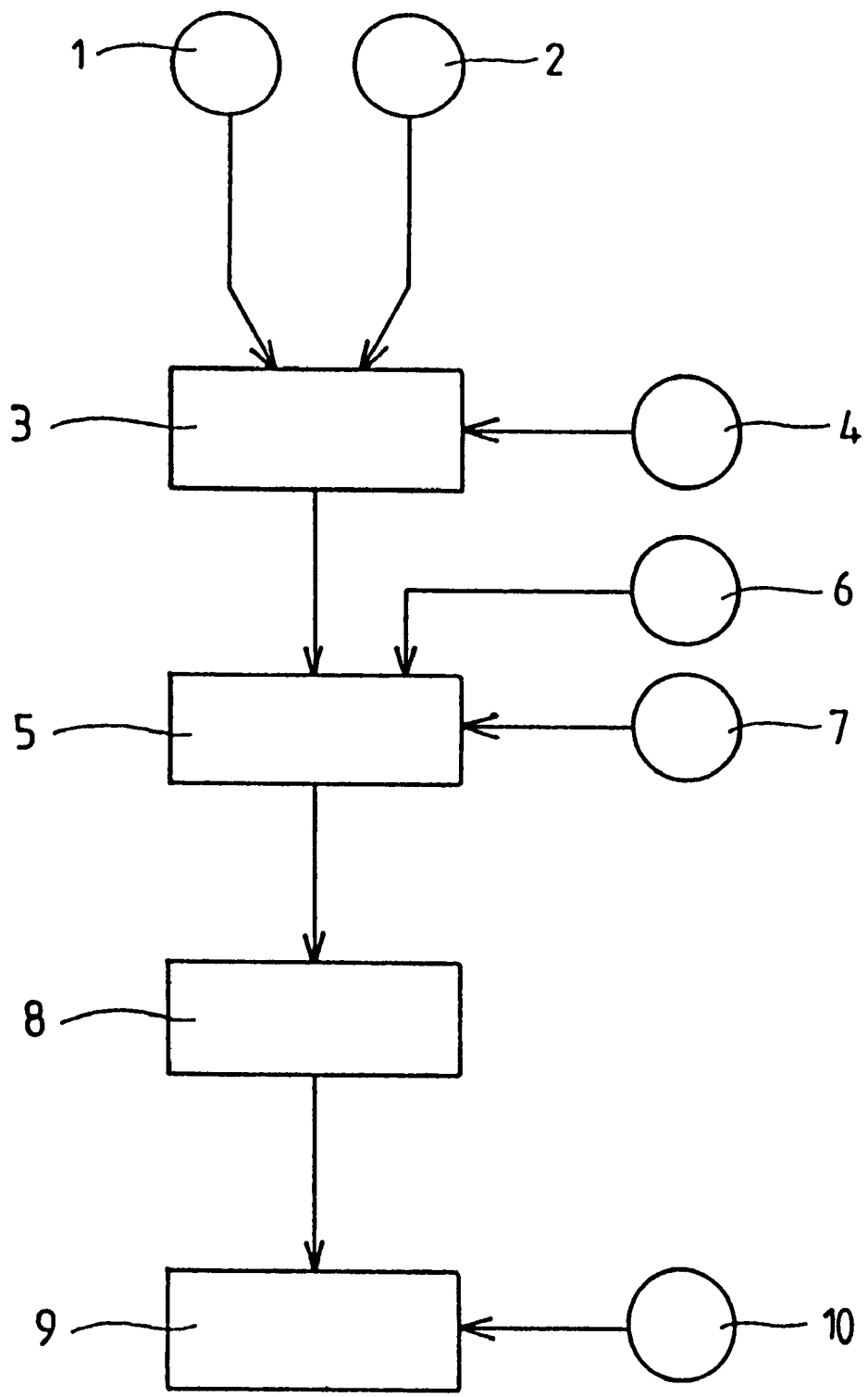

The accompanying figure symbolically represents the inventive method. In the illustrated embodiment pursuant to a first step of the inventive method raw materials 1, 2, for example iron powder 1 and an aluminum powder 2, which have been reduced in size are mixed together in a dry state, for example in a conventional sand mixer 3. In a second step of the inventive method, the mixed together size-reduced raw materials 1, 2 are prepared with at least one binder or binding agent 4, for example water glass. For this purpose, in the illustrated embodiment the water glass 4 is also fed to the sand mixer 3 and is mixed with the iron powder 1 and the aluminum powder 2. In the third step of the inventive method, the mixture composed of iron powder 1, aluminum powder 2 and water glass 4 is pressed into a mold 5, for example a core-forming machine, using compressed air. In addition, inserts 6 can be introduced into the mold 5, with these inserts increasing, for example, the stability of the molded article. In the next step of the inventive method, the mixture comprised of iron powder 1, aluminum powder 2 and water glass 4 is gasified with a gas 7, for example $CO_2$, and is thereby hardened. In a further step of the inventive method, the molded article is subjected to a thermal treatment for a second curing. For this purpose, the molded article is introduced into a furnace 8 and is further hardened at approximately 200° C. In doing so, the metal powders 1 and 2 are not to melt (sinter). In a final step of the inventive method, a molded article that is produced in this manner is coated with polymeric material 10, for example in an immersion bath 9.

The present invention is, of course, in no way restricted to the specific disclosure of the specification and drawings, but also encompasses any modifications within the scope of the appended claims.

List of Reference Numerals

1 Raw materials
2 Raw material
3 Sand mixer
4 Binder
5 Mold
6 Inserts
7 Gas
8 Furnace
9 Immersion bath
10 Polymeric material

What I claim is:

1. A method of producing a molded article, including the steps of:

mixing together raw materials in the form of metals that have been reduced in size to form a mixture;

preparing said mixture with at least one binder;

pressing the prepared mixture into a mold;

hardening said mixture; and coating with polymeric material a molded article resulting from said hardening step.

2. A method according to claim 1, wherein said binder is selected from the group consisting of water glass, paraffin, and thermoplastics.

3. A method according to claim 1, wherein said raw materials are mixed together in a dry state.

4. A method according to claim 1, wherein raw materials having varying grain sizes are used.

5. A method according to claim 1, wherein a permanent mold is used as said mold.

6. A method according to claim 1, wherein said pressing step is effected with compressed air.

7. A method according to claim 1, wherein at least on insert is disposed in said mold.

8. A method according to claim 1, wherein said hardening step is effected by means of gasification.

9. A method according to claim 8, wherein $CO_2$ is utilized for said gasification.

10. A method according to claim 1, wherein a molded article that results from said hardening step is subjected to further hardening.

11. A method according to claim 10, wherein said further hardening is effected by an annealing operation.

12. A method according to claim 1, wherein said preparing step comprises providing up to 20% water glass.

13. A method according to claim 1, wherein said pressing step is effected with a core shooter or core-forming machine.

14. A method according to claim 1, wherein said preparing step results in an exothermic reaction.

15. A molded article produced by the method of claim 1, wherein said molded article has a density of between 5 and 6.

* * * * *